United States Patent
Francois et al.

(10) Patent No.: US 8,520,141 B2
(45) Date of Patent: Aug. 27, 2013

(54) METHOD OF PREDICTING MOTION AND TEXTURE DATA

(75) Inventors: Edouard Francois, Bourg des Comptes (FR); Vincent Bottreau, Chateaubourg (FR); Patrick Lopez, Livre sur Changeon (FR); Jérôme Vieron, Bedee (FR); Ying Chen, San Diego, CA (US)

(73) Assignee: Thomson Licensing, Issy les Moulineaux (FR)

( * ) Notice: Subject to any disclaimer, the term of this patent is extended or adjusted under 35 U.S.C. 154(b) by 791 days.

(21) Appl. No.: 12/085,791

(22) PCT Filed: Nov. 22, 2006

(86) PCT No.: PCT/EP2006/068776
§ 371 (c)(1),
(2), (4) Date: Jan. 24, 2011

(87) PCT Pub. No.: WO2007/063017
PCT Pub. Date: Jun. 7, 2007

(65) Prior Publication Data
US 2011/0170001 A1 Jul. 14, 2011

(30) Foreign Application Priority Data
Dec. 1, 2005 (FR) ...................... 05 53677

(51) Int. Cl.
*H04N 7/12* (2006.01)
(52) U.S. Cl.
USPC .......................... 348/452; 348/448

(58) Field of Classification Search
USPC ......................... 348/441, 448, 452
See application file for complete search history.

(56) References Cited

U.S. PATENT DOCUMENTS

| | | | |
|---|---|---|---|
| 5,270,813 A | 12/1993 | Puri et al. | |
| 5,742,343 A | 4/1998 | Haskell et al. | |
| 6,400,768 B1 * | 6/2002 | Nagumo et al. | 375/240.18 |
| 6,493,391 B1 | 12/2002 | Komori et al. | |
| 7,961,785 B2 | 6/2011 | Marquant et al. | |
| 7,970,056 B2 | 6/2011 | Soroushian | |

(Continued)

FOREIGN PATENT DOCUMENTS

| | | |
|---|---|---|
| EP | 0577337 | 1/1994 |
| EP | 0644695 | 3/1995 |

(Continued)

OTHER PUBLICATIONS

Schwartz, Heiko et al., "Constrained Inter-Layer Prediction for Single-Loop Decoding in Spatial Scalability", Image Processing, 2005, IEEE International Conf, Genova, Italy Sep. 11-14, 2005, pp. 870-873.

(Continued)

*Primary Examiner* — Jefferey Harold
*Assistant Examiner* — Justin Sanders
(74) *Attorney, Agent, or Firm* — Robert D. Shedd; Jeffrey M. Navon

(57) ABSTRACT

A method for generating for at least one block of pixels of a picture of a sequence of progressive pictures at least one motion predictor and at least one texture predictor from motion data, respectively texture data, associated with the pictures of a sequence of low resolution interlaced pictures.

11 Claims, 2 Drawing Sheets

(56) References Cited

U.S. PATENT DOCUMENTS

| | | |
|---|---|---|
| 8,023,561 B1 | 9/2011 | Garrido et al. |
| 8,155,192 B2 | 4/2012 | Marquant et al. |
| 2002/0041632 A1 | 4/2002 | Sato et al. |
| 2003/0086622 A1* | 5/2003 | Gunnewiek et al. .......... 382/240 |
| 2003/0185456 A1 | 10/2003 | Sato et al. |
| 2004/0013195 A1* | 1/2004 | Panusopone et al. ...... 375/240.2 |
| 2005/0089098 A1 | 4/2005 | Sato et al. |
| 2005/0129122 A1 | 6/2005 | Booth et al. |
| 2005/0190844 A1 | 9/2005 | Kando et al. |

FOREIGN PATENT DOCUMENTS

| | | |
|---|---|---|
| EP | 0883300 | 12/1998 |
| JP | 6078292 | 3/1994 |
| JP | 6209468 | 7/1994 |
| JP | 07162870 | 6/1995 |
| JP | 1118085 | 1/1999 |
| JP | 2001045475 | 2/2001 |
| JP | 2009517941 | 4/2009 |
| WO | WO 2005/064948 | 7/2005 |
| WO | WO2007063017 | 6/2007 |

OTHER PUBLICATIONS

Marquant, G. et al., "Extended Spatial Scalability for Non Dyadic Video Formats: from SDTV to HDTV", Visual Communications and Image Processing 2005, Proc. of SPIE, vol. 5960, pp. 547-558.

Lauzon, D. et al., "Spatial Predicion in Scalable Video Coding", International Broadcasting Convention Conference Publication No. 413, Sep. 14-18, 1995, pp. 244-249.

Chiang, Tihao et al., "Hierarchical coding of Digital Television", IEEE Communications Magazine, May 1994, pp. 38-45.

S. Bayrakeri et al: "MPEG-2/ECVQ Lookahead Hybrid Quantization and Spatially Scalable Coding", Proceedings of the SPIE, vol. 3024, 1997, pp. 129-137 XP008042521.

J. Reichel et al: "Joint Scalable Video Model JSVM-3", Joint Video Team (JVT) of ISO/IEC MPEG & ITU-T VCEG, Jul. 29, 2005, pp. 1-34, XP002384686.

A. Puri et al: "Spatial domain resolution scalable video coding" Proceedings of the SPIE, vol. 2094, 1993, pp. 718-729.

Search Report Dated Mar. 22, 2007.

* cited by examiner

METHOD OF PREDICTING MOTION AND TEXTURE DATA

This application claims the benefit, under 35 U.S.C. §365 of International Application PCT/EP2006/068776, filed Nov. 22, 2006, which was published in accordance with PCT Article 21(2) on Jun. 7, 2007 in English and which claims the benefit of French patent application No. 0553677, filed Dec. 1, 2005.

1. BACKGROUND OF THE INVENTION

The invention relates to a method for generating, for pictures of a high resolution progressive sequence, at least one motion predictor and, where appropriate, at least one texture predictor from motion data and, where appropriate, texture data associated with pictures of a low resolution interlaced sequence.

2. FIELD OF INVENTION

Hierarchical encoding methods with spatial scalability are known. Scalability represents the ability to stagger information to make it decodable at multiple resolution and/or quality levels. More specifically, a data stream generated by this type of encoding method is divided into several layers, in particular a basic layer and one or more enhancement layers. These methods are used in particular to adapt a single data stream to variable transport conditions (bandwidth, error ratios, etc.), and to the expectations of the customers and the varying capabilities of their receivers (CPU, specifications of the display device, etc.). In the particular case of spatial scalability, the part of the data stream corresponding to low resolution pictures of the sequence can be decoded independently of the part of the data stream corresponding to the high resolution pictures. On the other hand, the part of the data stream corresponding to high resolution pictures of the sequence can be decoded only from the part of the data stream corresponding to the low resolution pictures.

Hierarchical encoding with spatial scalability makes it possible to encode a first data part called basic layer, relative to the low resolution pictures and, from this basic layer, a second data part called enhancement layer, relative to the high resolution pictures. Normally, each macroblock of the high resolution picture is temporally predicted according to a conventional prediction mode (for example, bidirectional prediction mode, direct prediction mode, early prediction mode, etc.) or indeed is predicted according to an inter-layer prediction mode. In this latter case, motion data (for example, a partitioning of the macroblock into blocks, possibly motion vectors and reference picture indices) and, where appropriate, texture data associated with a block of pixels of the high resolution picture is deduced or inherited from the motion data, respectively texture data, associated with blocks of pixels of a low resolution picture. The known methods do not allow such predictors to be generated in the case where the low resolution sequence is interlaced and the high resolution sequence is progressive.

3. SUMMARY OF THE INVENTION

The object of the invention is to overcome at least one of these drawbacks of the prior art.

The invention relates in particular to a method for generating for at least one block of pixels of a picture of a sequence of high resolution progressive pictures, called high resolution sequence, at least one motion predictor from motion data associated with the pictures of a sequence of low resolution interlaced pictures, called low resolution sequence, of the same temporal frequency as the high resolution sequence. Each interlaced picture comprises a top field interlaced with a bottom field and that can be coded in field mode or in frame mode. Each progressive picture and each field of an interlaced picture has associated with it a temporal reference. According to the invention, at least one motion predictor is generated for a block of pixels of the high resolution picture on the basis of the motion data associated with at least one block of pixels of the top or bottom field of a low resolution picture of the same temporal reference as the high resolution picture if the low resolution picture is coded in field mode. If the high resolution picture is of the same temporal reference as the top field of a low resolution picture and if the low resolution picture is coded in frame mode, a motion predictor is generated for a block of pixels of the high resolution picture on the basis of the motion data associated with at least one block of pixels of the low resolution picture. Otherwise no motion predictor is generated.

Preferably, if the low resolution picture is coded in field mode, a motion predictor is generated by sub-sampling the said motion data associated with at least one block of pixels of the top or bottom field of the low resolution picture of the same temporal reference as the high resolution picture with a horizontal inter-layer ratio in the horizontal direction of the picture and a first vertical inter-layer ratio in the vertical direction of the picture.

Advantageously, if the low resolution picture is coded in frame mode and if the high resolution picture is of the same temporal reference as the top field of the low resolution picture, a motion predictor is generated by subsampling the said motion data associated with at least one block of pixels of the low resolution picture with the horizontal inter-layer ratio in the horizontal direction of the picture and a second vertical inter-layer ratio in the vertical direction of the picture.

Preferably, a texture predictor is generated for a block of pixels of the high resolution picture on the basis of the texture data associated with at least one block of pixels of the top or bottom field of a low resolution picture of the same temporal reference as the high resolution picture.

Advantageously, the texture predictor is generated by sub-sampling the said texture data associated with at least one block of pixels of the top or bottom field of the low resolution picture of the same temporal reference as the high resolution picture with the horizontal inter-layer ratio in the horizontal direction of the picture and the first vertical inter-layer ratio in the vertical direction of the picture.

According to a particular characteristic, the horizontal inter-layer ratio is equal to the width of the high resolution pictures divided by the width of the fields of the low resolution pictures, the first vertical inter-layer ratio is equal to the height of the high resolution pictures divided by the height of the fields of the low resolution pictures and the second vertical inter-layer ratio is equal to the height of the high resolution pictures divided by the height of the low resolution pictures.

Preferably, the motion data associated with the low resolution pictures comprises motion vectors and the motion vectors associated with a low resolution picture that are coded in frame mode or with each of the top and bottom fields of a low resolution picture coded in field mode have the same parity.

According to a particular embodiment, the method is used by a method of encoding high resolution pictures from low resolution pictures.

Advantageously, the low resolution pictures are encoded according to the MPEG-4 AVC standard.

According to a particular embodiment, the method is used by a method of decoding high resolution pictures from low resolution pictures.

4. BRIEF DESCRIPTION OF THE SEVERAL VIEWS OF THE DRAWING(S)

The invention will be better understood and illustrated by means of exemplary embodiments and advantageous implementations, by no means limiting, given with reference to the appended figures in which.

5. DETAILED DESCRIPTION OF THE INVENTION

Figure 1:
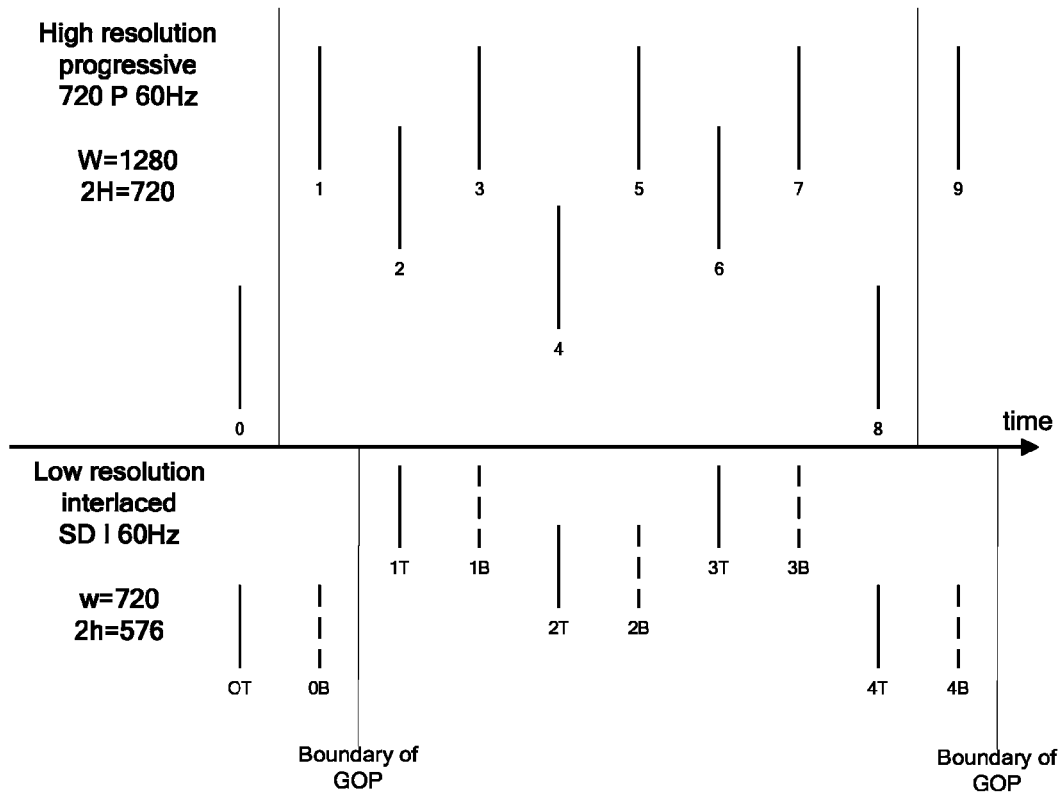
FIG. 1 represents an interlaced sequence of low resolution pictures and a progressive sequence of high resolution pictures with the same temporal frequency.

The invention relates to an inter-layer prediction method which consists in generating motion predictors and, where appropriate, texture predictors for pictures of a sequence of high resolution progressive pictures, called high resolution sequence, from pictures of a sequence of low resolution interlaced pictures, called low resolution sequence. The sequences are divided into groups of pictures (GOP). Each low resolution picture comprises a top field interlaced with a bottom field. In FIG. 1, an interlaced picture of index k is made up of a top field referenced kT and a bottom field referenced kB and a progressive picture is referenced by its index k. A temporal reference is associated with each picture of the high resolution sequence and with each field of the low resolution sequence. A high resolution picture and a field of a low resolution picture, called low resolution field, having the same temporal reference coincide vertically. The low resolution pictures, also referenced LR pictures, have a width w (w representing a number of pixels or columns) and a height of 2h (2h representing a number of pixels or lines and means 2 multiplied by h). Each field of a low resolution interlaced picture has a width w and a height h. The high resolution pictures, also referenced HR pictures, have a width W (W representing a number of pixels or columns) and a height of 2H (2H representing a number of pixels or lines and meaning 2 multiplied by H). In the embodiment described, the interlaced pictures can be encoded either in field picture mode, i.e. each field is encoded as a separate picture, or even in frame picture mode, i.e. the two fields are encoded together. The lines of a picture are numbered from 0 and therefore the first line is an even line and the second line (numbered 1) is an odd line.

The invention therefore consists in generating, for pictures of the high resolution sequence or for at least one block of pixels of the latter, at least one motion predictor and, where appropriate, at least one texture predictor. A texture predictor associated with a high resolution picture or with at least one block of pixels of a high resolution picture is a picture or a prediction block which associates with each of its pixels texture data (for example, a luminance value and, where appropriate, chrominance values), which is generated from texture data associated with at least one picture (or field) or at least one block of pixels of a low resolution picture (or at least one block of pixels of a field) according to a method of sub-sampling the texture such as the ESS method applied to the texture (ESS standing for Extended Spatial Scalability) which is described in sections S.8.3.6.4 and S.8.5.14.2 of document ISO/IEC MPEG & ITU-T VCEG, entitled "Joint Scalable Video Model JSVM3 Annex-S", referenced JVT-P202, J. Reichel, H. Schwarz, M. Wien. This document is referenced JSVM3 below. A motion predictor associated with a high resolution picture or with at least one block of pixels of a high resolution picture is defined as a prediction picture or a prediction block with which is associated motion data (for example, a type of partitioning, possibly reference picture indices making it possible to identify the reference pictures to which the motion vectors point). The motion predictor is generated from motion data associated with at least one picture (or field) or at least one block of pixels of a low resolution picture (or at least one block of pixels of a field) according to a motion sub-sampling method such as the ESS method applied to the motion which is described in section S.8.4.1.6.3 of JSVM3, or such as the modified ESS method, described below, derived from the ESS method applied to the motion. The modified ESS method, referenced MESS in FIG. 3, makes it possible in particular to process high and/or low resolution interlaced sequences. More specifically, it makes it possible to deal with the case where the height or the width of the high resolution picture is less than that of the low resolution picture. Furthermore, it makes it possible advantageously to avoid having the motion predictors include invalid motion vectors, i.e. vectors that point to unavailable reference pictures, when the prediction method according to the invention is used by a hierarchical encoding or decoding method. According to the modified ESS method, an intermediate motion predictor is generated by sub-sampling by 2 the motion data associated with the low resolution picture, more particularly, the motion data associated with each of the macroblocks of the low resolution picture, in the vertical direction of the picture, in the horizontal direction of the picture or in both directions. The method of sub-sampling by 2 is repeated in the vertical direction of the picture as long as the height of said intermediate predictor is greater than the height of the high resolution picture and it is repeated in the horizontal direction of the picture as long as the width of said intermediate predictor is greater than the width of the high resolution picture. The sub-sampling consists in particular in dividing by two the coordinates of the motion vectors associated with the blocks of pixels. For example, with reference to FIG. 4, based on two macroblocks MB1 or MB2 of the low resolution picture possibly divided into blocks of pixels, a macroblock MB of the intermediate motion predictor is generated. The size of the blocks of pixels in a macroblock is indicated above said macroblock. For example, in the second line of FIG. 4, the macroblock MB1 is not divided, the macroblock MB2 is divided into two blocks measuring 8 by 16 pixels (denoted 8×16) and the macroblock MB generated from these two macroblocks is divided into four 8×8 blocks, two of which are divided into 4×8 blocks. The indices of reference pictures are made uniform between the blocks of 8 by 8 pixel size within a macroblock MB, and isolated intra-type blocks within a macroblock MB are deleted in the same way as in the ESS inter-layer prediction method applied to the motion and described in JSVM3.

The motion predictor associated with the high resolution picture is generated from the last intermediate motion predictor generated in this way, by applying the ESS method (section S.8.4.1.6.3 of JSVM3) with an inter-layer ratio equal to $$\frac{W}{w_i}$$

in the horizontal direction of the picture and $$\frac{2H}{2h_i}$$

in the vertical direction of the picture, where $w_i$ is the width and $2h_i$ is the height of the last intermediate motion predictor generated. Furthermore, for each prediction macroblock, the motion vector inheritance method is modified so as not to generate invalid motion vectors, i.e. vectors that point to fields or frame pictures that are not available in the temporal breakdown process. In this case, if all the motion vectors associated with a prediction macroblock MB_pred are invalid then the inter-layer motion prediction is not authorized for this macroblock. Otherwise, (i.e. if at least one of the vectors is valid), the ESS prediction method applied to the motion is used.

Figure 2:
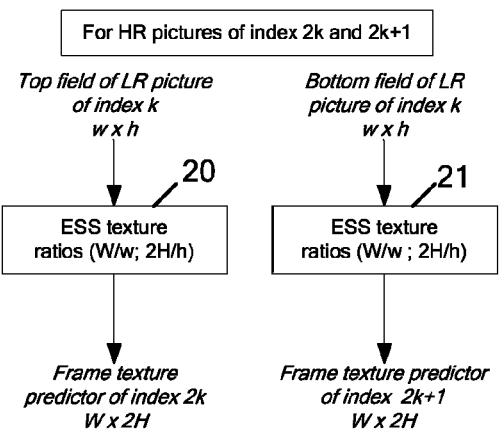
FIG. 2 illustrates the method of generating texture predictors according to the invention in the case where the sequence of low resolution pictures is interlaced and the sequence of high resolution pictures is progressive.
Figure 3:
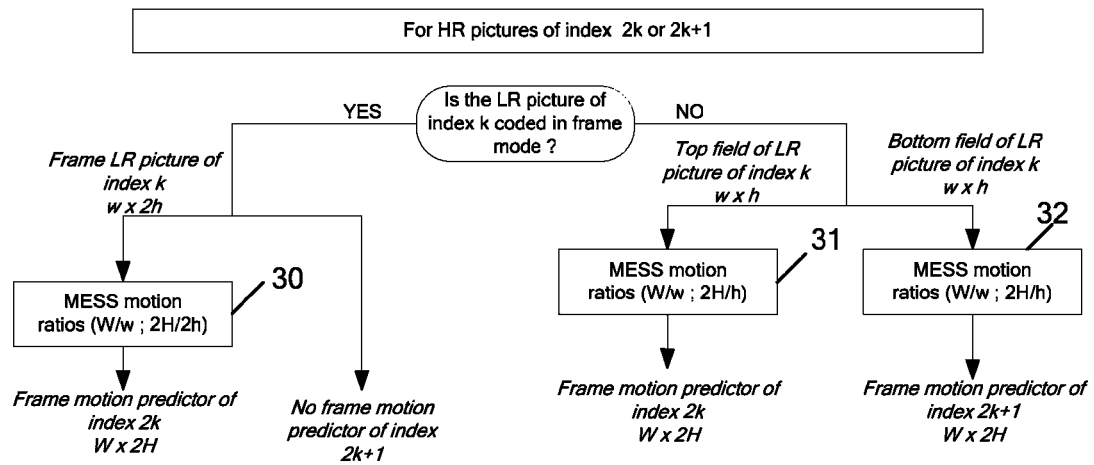
FIG. 3 illustrates the method of generating motion predictors according to the invention in the case where the sequence of low resolution pictures is interlaced and the sequence of high resolution pictures is progressive.
Figure 4:
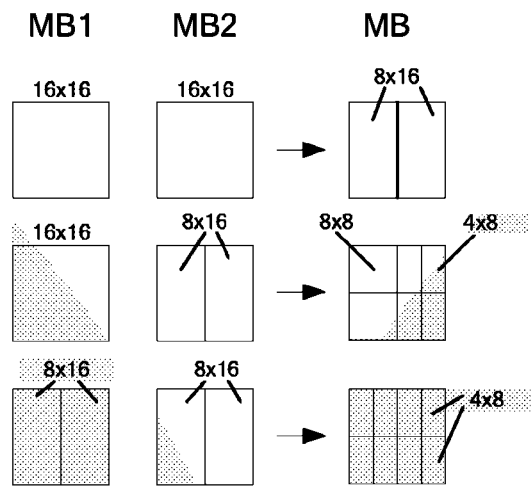
FIG. 4 illustrates the sub-sampling by a factor of 2 in the horizontal direction of the picture of two macroblocks MB1 and MB2 of a low resolution picture and the resulting partitioning for the corresponding predictor macroblock MB_pred.

The method according to the invention, illustrated by FIGS. 1 to 3, is described for a picture but can be applied to a part of a picture and in particular to a block of pixels, for example a macroblock. It makes it possible for example to handle the case of a low resolution interlaced sequence in the SD format, i.e. of dimension 720 by 288 pixels, 60 Hz and of a high resolution progressive sequence in the 720p format, i.e. 1280 by 720 pixels, 60 Hz or else the case of a low resolution interlaced sequence in the 1080i format, i.e. of dimension 1920 by 540 pixels, 60 Hz and of a high resolution progressive sequence in the 1080p format, i.e. 1920 by 1080 pixels, 60 Hz.

Texture predictors associated with high resolution pictures of index 2k and 2k+1 in FIG. 1 are generated in the following manner as illustrated by FIG. 2:

A frame texture predictor of dimension W by 2H associated with the high resolution picture of index 2k is generated 20 on the basis of the texture data of the top field of the low resolution picture of index k by applying the ESS method with an inter-layer ratio of W/w in the horizontal direction of the picture and $$\frac{2H}{h}$$

in the vertical direction of the picture.

A frame texture predictor of dimension W by 2H associated with the high resolution picture of index 2k+1 is generated 21 on the basis of the texture data of the bottom field of the low resolution picture of index k by applying the ESS method with an inter-layer ratio of W/w in the horizontal direction of the picture and $$\frac{2H}{h}$$

in the vertical direction of the picture.

If the low resolution picture of index k is coded in frame mode, no frame motion predictor associated with the high resolution picture of index 2k+1 is generated and a frame motion predictor of dimension W by 2H associated with the high resolution picture of index 2k in FIG. 1 is generated 30 on the basis of the motion data associated with the frame low resolution picture of index k as illustrated by FIG. 3 by applying the modified ESS method with an inter-layer ratio of W/w in the horizontal direction of the picture and $$\frac{2H}{h}$$

in the vertical direction of the picture.

In other cases, i.e. if the low resolution picture of index k is coded in field mode, motion predictors associated with the high resolution pictures of index 2k and 2k+1 in FIG. 1 are generated in the following manner as illustrated by FIG. 3:

A frame motion predictor of dimension W by 2H associated with the high resolution picture of index 2k is generated 31 on the basis of the motion data of the top field of the low resolution picture of index k by applying the modified ESS method with an inter-layer ratio of W/w in the horizontal direction of the picture and $$\frac{2H}{h}$$

in the vertical direction of the picture.

A frame motion predictor of dimension W by 2H associated with a high resolution picture of index 2k+1 is generated 32 on the basis of the motion data of the bottom field of the low resolution picture of index k by applying the modified ESS method with an inter-layer ratio of W/w in the horizontal direction of the picture and $$\frac{2H}{h}$$

in the vertical direction of the picture.

According to a particular characteristic, it is possible to permit only the motion vectors with the same parity to code the low resolution pictures so as to be able to delete one field out of two from the low resolution sequence and one frame picture out of two from the high resolution sequence so that the digital data generated by a method of coding using the method of prediction according to the invention are temporally scaleable.

If the method is used by a coding method all motion predictors (respectively texture predictors) may be generated in order to select the most appropriate one according to a given criteria, e.g. a rate distorsion criteria. If said method is used by a decoding method then a single motion predictor (respectively a single texture predictor) is generated, the type of predictor being specified in the bitstream.

Of course, the invention is not limited to the above-mentioned exemplary embodiments. In particular, those skilled in the art can apply any variant to the embodiments described and combine them to benefit from their different advantages. For example, the method according to the invention can be applied to a part of the high resolution picture. In practice, it is possible to generate motion and/or texture predictors for blocks of pixels (for example, macroblocks measuring 16 by 16 pixels) of the high resolution picture from motion and/or texture data associated with blocks of pixels of the low resolution pictures. Similarly, the invention has been described in the case where the top field of an interlaced picture is displayed first ("top field first" case) and can be extended directly to the case where the bottom field is displayed first ("bottom field first" case) by reversing the top and bottom fields. Moreover, the invention can also be extended to the case of several high resolution sequences (i.e. several enhancement layers). Furthermore, the invention is advantageously used by a method of encoding or decoding a sequence of pictures or video. Preferably, the sequence of low resolution pictures is encoded according to the MPEG4 AVC encoding standard defined in document ISO/IEC 14496-10 ("Information technology—Coding of audio-visual objects—Part 10: Advanced Video Coding").

The invention claimed is:

1. Method for generating for at least one block of pixels of a picture of a sequence of high resolution progressive pictures, called high resolution sequence, at least one motion predictor from motion data associated with the pictures of a sequence of low resolution interlaced pictures, called low resolution sequence, each interlaced picture comprising a top field interlaced with a bottom field and that can be coded in frame mode or in field mode, a temporal reference being associated with each progressive picture and each field of interlaced picture, wherein said method comprises:

generating said at least one motion predictor for the said at least one block of pixels of the said high resolution picture on the basis of motion data associated with at least one block of pixels of the top and/or bottom field of a low resolution picture of the same temporal reference as the said high resolution picture when the said low resolution picture is coded in field mode; and generating said at least one motion predictor for the said at least one block of pixels of the said high resolution picture on the basis of motion data associated with at least one block of pixels of the said low resolution picture, when the said high resolution picture is of the same temporal reference as the top or bottom field of the low resolution picture and the said low resolution picture is coded in frame mode.

2. Method according to claim 1, wherein, when the said low resolution picture is coded in field mode, the said at least one motion predictor is generated by sub-sampling the said motion data associated with the said at least one block of pixels of the said top and/or bottom field of the said low resolution picture of the same temporal reference as the said high resolution picture with a horizontal inter-layer ratio in the horizontal direction of the picture and a first vertical inter-layer ratio in the vertical direction of the picture.

3. Method according to claim 2, wherein when the said low resolution picture is coded in frame mode and when the said high resolution picture is of the same temporal reference as the top or bottom field of the said low resolution picture, the said at least one motion predictor is generated by subsampling the said motion data associated with the said at least one block of pixels of the said low resolution picture with the said horizontal inter-layer ratio in the horizontal direction of the picture and a second vertical inter-layer ratio in the vertical direction of the picture.

4. Method according to claim 2, wherein a texture predictor is generated for the said at least one block of pixels of the said high resolution picture on the basis of the texture data associated with the at least one block of pixels of the top or bottom field of the low resolution picture of the same temporal reference as the said high resolution picture.

5. Method according to claim 4, wherein the said texture predictor is generated by subsampling the said texture data associated with the said at least one block of pixels of the top or bottom field of the said low resolution picture of the same temporal reference as the said high resolution picture with the said horizontal inter-layer ratio in the horizontal direction of the picture and the said first vertical inter-layer ratio in the vertical direction of the picture.

6. Method according to claim 3, wherein said horizontal inter-layer ratio is equal to the width of the high resolution pictures divided by the width of the fields of the low resolution pictures, said first vertical inter-layer ratio is equal to the height of the high resolution pictures divided by the height of the fields of the low resolution pictures and in that the second vertical inter-layer ratio is equal to the height of the high resolution pictures divided by the height of the low resolution pictures.

7. Method according to claim 1, wherein the motion data associated with the low resolution pictures comprises motion vectors.

8. Method according to claim 7, wherein the motion vectors associated with the low resolution picture that are coded in frame mode or with each of the top and bottom fields of the low resolution picture coded in field mode have the same parity.

9. Method according to claim 1, wherein said method is used by a method of encoding high resolution pictures from low resolution pictures.

10. Method according to claim 9, wherein the low resolution pictures are encoded according to the MPEG-4 AVC standard.

11. Method according to claim 1, wherein said method is used by a method of decoding high resolution pictures from low resolution pictures.

* * * * *